D. MARRS.
Scraping and Loading Machines.
No. 135,042. Patented Jan. 21, 1873.
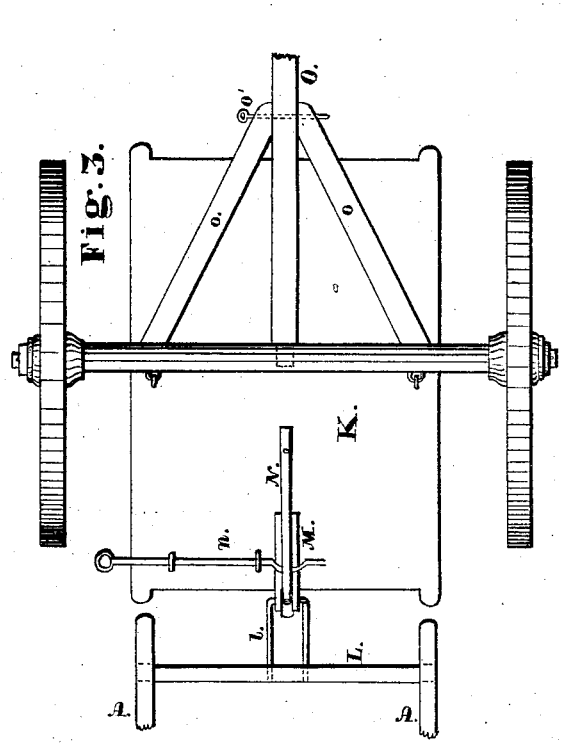
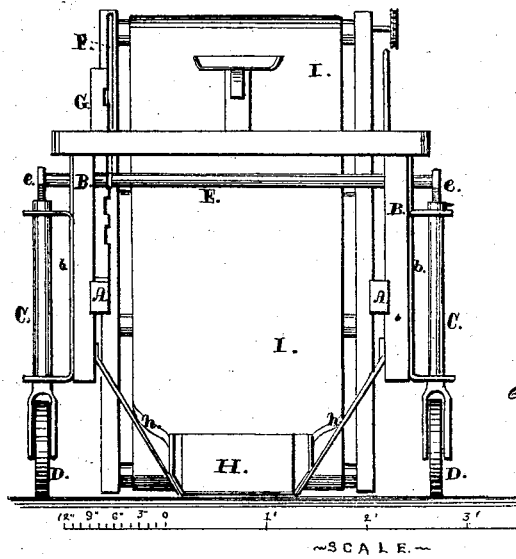
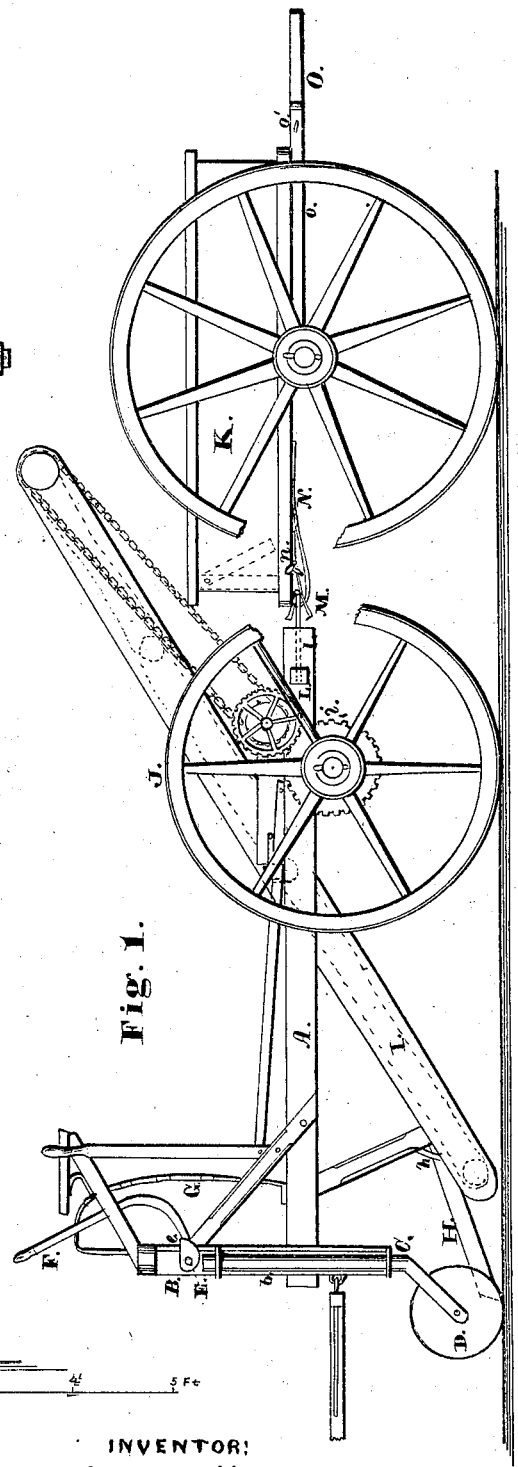
WITNESSES:
Edwin N. Lapham.
Luther L. Ferriss.
INVENTOR:
DANIEL MARRS,
per Charles P. Housum,
His Attorney

UNITED STATES PATENT OFFICE.

DANIEL MARRS, OF FRIENDS' CREEK TOWNSHIP, MACON COUNTY, ILLINOIS, ASSIGNOR OF TWO-THIRDS HIS RIGHT TO HENRY H. MARRS AND GRANVILLE B. CARTER, OF SAME PLACE.

IMPROVEMENT IN SCRAPING AND LOADING MACHINES.

Specification forming part of Letters Patent No. 135,042, dated January 21, 1873.

*To all whom it may concern:*

Be it known that I, DANIEL MARRS, of Friends' Creek township, county of Macon and State of Illinois, have invented certain Improvements in Scraping and Loading Machines, of which the following is a specification:

My invention relates to an improvement in scraping and loading machines; and consists in the construction of the frame of the machine with a scraper attached thereto; the devices for regulating the depth of the scraper in the plowed ground, in combination with an endless apron that carries and deposits the earth in a cart, the rear part of which is attached to the rear part of the machine.

Figure 1 is a side elevation of a machine embodying my invention; Fig. 2 is a front elevation of the same; and Fig. 3, a plan of the bottom of the cart.

A A is the main frame of the machine, supported by the wheels J J and D D. B B are perpendicular pieces attached and braced to the frame. On these pieces are plates $b\ b$, that answer as supports for the rods C C. These rods are bifurcated and hold the wheels D D. E is a rod, on each end of which is a cam, $e$, said rod having bearings in the pieces B B. F is the lever that operates the rod E, and engages in slots in the segment G. The scraper H is attached to the pieces B B, and the braces of the frame A A with braces $h\ h\ h\ h$. I is an elevator operated with gearing attached to the wheel J, and can be thrown out of gear by a rod extending along the frame and attached to a lever at the front of the machine.

The machine is operated as follows, viz: After the ground is plowed preparatory for the scraper, the cart is backed up to the rear part of the machine and coupled thereto, the pin $o'$ removed, and the horses with the pole O taken away from the cart, the double-trees being attached to the pole. The machine is drawn forward, the scraper let down into the earth through the medium of the lever and cam. As the earth is pressed back on the scraper it is carried on the endless apron and deposited in the cart. After the cart is filled the horses are backed thereto and the pole attached to the cart with the pin $o'$. By this means it is not necessary to unhitch the team from the pole, and the pole O can be attached to the front of the machine by a similar device.

The lever that operates the cams $e\ e$ and the one that throws the machine in or out of gear are under control of the driver on the seat on the transverse bar across the top of the pieces B B.

I claim as my invention—

The combination of the frame A A, constructed as described, pieces B B, wheels J J D D, rod E, cams $e\ e$, lever F, and segment G with the scraper H and endless apron I, all arranged as shown and described, and for the purpose set forth.

DANIEL MARRS.

Witnesses:
CHARLES P. HOUSUM,
JOHN L. MARCH.